Dec. 22, 1970  E. RICCI ETAL  3,549,492
FLUID SUPPORTED CAPSULE HOLDER FOR
HOMOGENEOUSLY IRRADIATING SAMPLES
Filed May 12, 1969  3 Sheets-Sheet 1
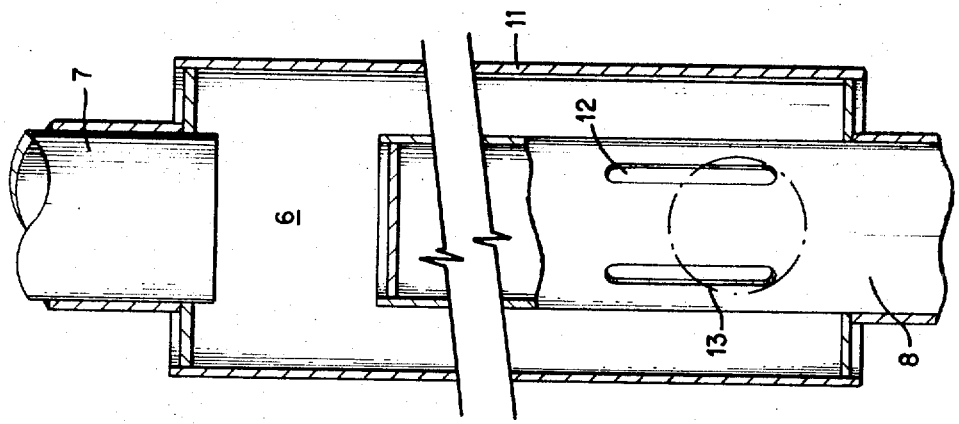
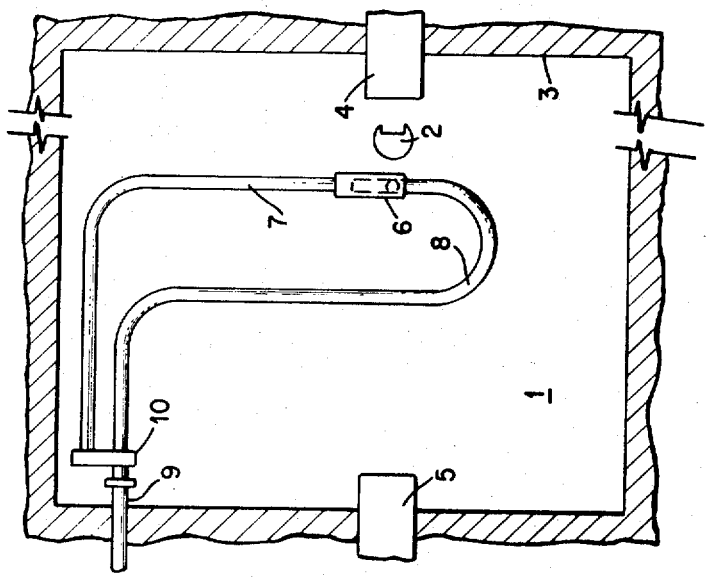
INVENTORS.
Enzo Ricci
Thomas H. Handley
Melvin G. Willey
BY
ATTORNEY.

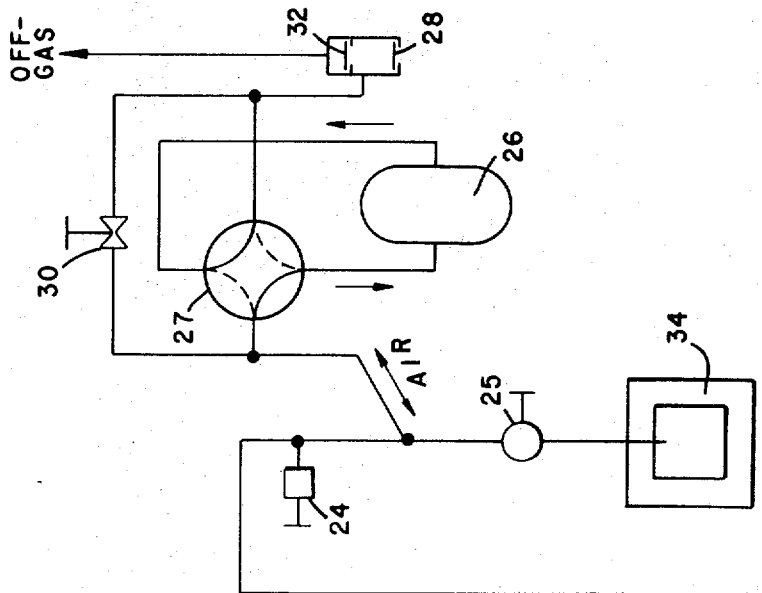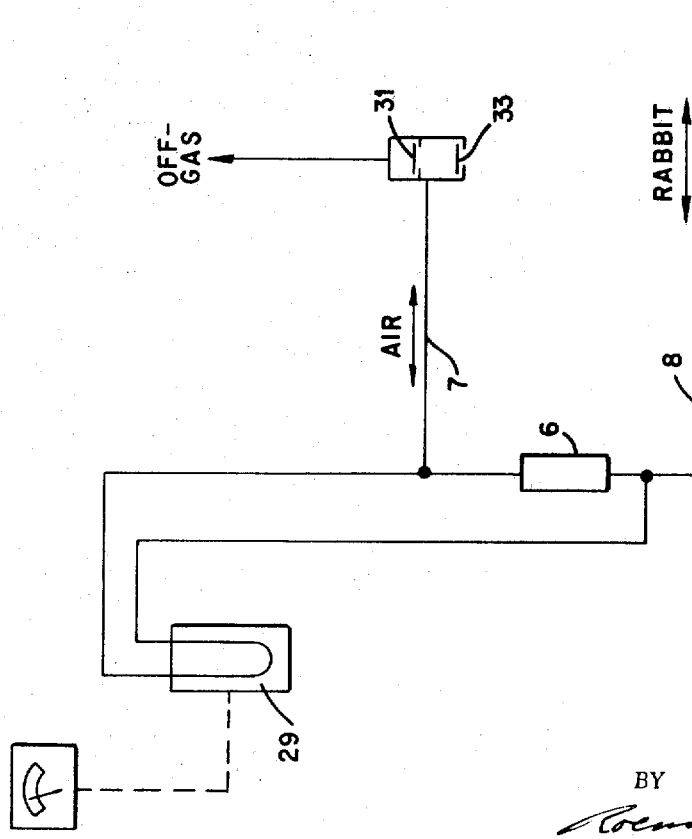
Fig. 4
INVENTORS.
Enzo Ricci
Thomas A. Handley
Melvin G. Willey
ATTORNEY.

United States Patent Office 3,549,492
Patented Dec. 22, 1970

3,549,492
FLUID SUPPORTED CAPSULE HOLDER FOR HOMOGENEOUSLY IRRADIATING SAMPLES
Enzo Ricci and Thomas H. Handley, Oak Ridge, and Melvin G. Willey, Knoxville, Tenn., assignors to the United States of America as represented by the United States Atomic Energy Commission
Filed May 12, 1969, Ser. No. 823,888
Int. Cl. G01c 1/00
U.S. Cl. 176—15                    2 Claims

ABSTRACT OF THE DISCLOSURE

A spherical multisample holder is employed so as to permit transfer from a remote loading position to an irradiating position. This holder may then be held by a column of fluid, such as air, for a sufficient irradiation time during which its orientation changes randomly due to its unique structure to thus effect a homogeneous irradiation of all samples. The spherical holder may then be returned to a remote unloading position.

BACKGROUND OF THE INVENTION

This invention was made in the course of, or under, a contract with the U.S. Atomic Energy Commission.

Some of the problems of irradiating multiple samples for activation analysis and the like were described in the copending application of L. C. Bate et al., Ser. No. 715,080, filed Mar. 21, 1968, and having a common assignee with the present application. As pointed out in the prior application, the irradiation environment has significant variations (as a function of time and position) in the flux which would normally produce nonuniform dose to the various samples. The device disclosed in the prior application overcomes the specific problem adequately; however, it is not useable in certain installations. For example, the operation of the prior device within a portion of a nuclear reactor or a high energy electron linear accelerator would be difficult from a standpoint of loading and unloading. Intricate equipment would be required to align a pneumatic delivery tube with the sample holder since the delivery tube would have to be out of contact with the same holder during an irradiation cycle because of the simultaneous rotation of the sample holder about two mutually perpendicular axes during such an irradiation cycle.

Thus, there exists a need for a system wherein a multisample holder may be injected into an irradiation chamber and then be withdrawn therefrom remotely, while at the same time providing means for effecting random motion of the holder thereby effecting the homogeneous irradiation of the multisamples when disposed within the chamber with substantially uniform doses. The present invention was conceived to meet the above need in a manner to be discussed hereinbelow.

SUMMARY OF THE INVENTION

It is the object of the present invention to provide a method and system for transporting a multisample holder, containing a plurality of samples to be irradiated, from a remote loading position to an irradiation position, effecting the homogeneous irradiation of all samples at the irradiation position, and then transporting the sample holder to a remote unloading position.

The above object has been accomplished in the present invention by providing a system for transporting a substantially spherical multisample holder, containing a plurality of samples, from a remote loading position to an irradiation position, the holder being constructed so that it is not only held by a column of fluid, such as air, at the irradiation position but also the movement of the fluid around the holder effects a random orientation of the holder thereby effecting a homogeneous irradiation of all of the samples, and finally transporting the holder to a remote unloading position for a subsequent analysis of the irradiated samples.

Thus, it can be seen that in situations where it is desirable to irradiate a plurality of samples at a remote location such as within a portion of a nuclear reactor or a high energy electron linear accelerator, for example, the present invention provides a system in which such an objective can be achieved, while the prior system of the above-mentioned application was not designed for such remote operation nor does it suggest how such a remote operation could be effected.

BRIEF DESCRIPTION OF THE DRAWINGS

FIG. 1 is a schematic illustration of a typical irradiation facility in which the present invention can be utilized;

FIG. 2 is a cross sectional view of a chamber of the present system in which a sample containing holder may be irradiated;

FIG. 4 is a schematic drawing of the overall operating system of the present invention:

DESCRIPTION OF THE PREFERRED EMBODIMENT

Figure 3:
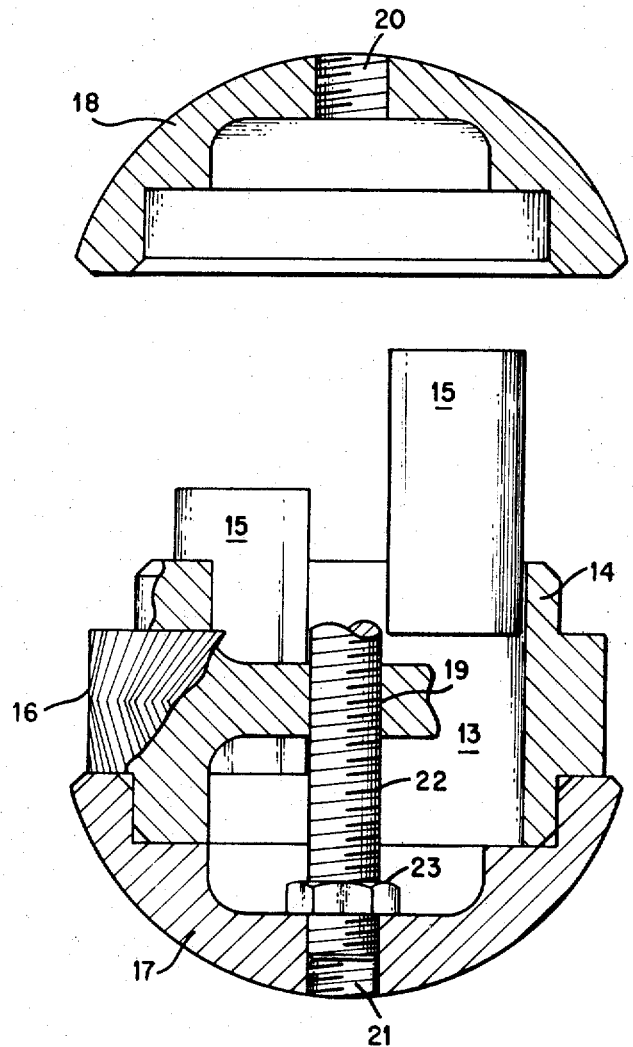
FIG. 3 is a cross sectional view, partially exploded, of the sample holder of the present invention.

Referring to FIG. 1, a target room 1, which may be operated at reduced pressure, has mounted therein a tantalum (or other heavy metal) target 2 in the general form of a sphere. Penetrating the shield 3, which surrounds the target room 1, is a duct 4 through which are passed the high energy electrons from a linear accelerator, not shown. The bore of the duct 4 is aligned to intersect the target 2. Neutrons and photons are produced by bombardment of the target 2 with the electrons. Some of this radiation passes out of the target room through a drift tube 5 to various experiment stations, and other portions of the radiation are used to irradiate experiments within the target room 1, such as the chamber 6. Conduits 7, 8 lead to this chamber 6 and, at the interior surface of the shield 3, communicate with a coaxial tube 9 at a header 10 so as to permit rotation of the equipment to a storage position when not in use.

The chamber 6 is shown in more detail in FIG. 2. A cylindrical body member 11 is penetrated vertically from the bottom by the aforementioned conduit 8, and from the top by aforementioned conduit 7. These conduits are permanently sealed, as by welding or brazing, onto the body member. The conduit 8 extends upward into the body member 11 and is closed at the top as shown. A plurality of longitudinal slots 12 in the wall of conduit 8 permit gas flow into or out of conduits 7, 8. It is at the position of these slots 12 that a spherical sample containing holder 13, shown in dashed lines, is positioned for irradiation in a manner to be described hereinbelow.

A detailed view of the sample holder 13 is shown in FIG. 3. A central generally cylindrical body 14 is bored to receive a plurality, e.g., four, sample capsules 15. A portion of the peripheral surface 16 of the body 14 is knurled and the remaining portions provide shoulders to receive a pair of hemispherical covers 17, 18. Extraneous material is removed from the interior of the body 14 and covers 17, 18 to minimize the total mass of the sample holder. A central bore 19 in the body 14 and threaded openings 20, 21 in the covers 18, 17 accommodate an assembly bolt 22 which is shown in the lower assembled view of FIG. 3. A lock nut 23 secures the bolt in cover 17 while cover 18 is being attached. It should be noted that the two sample capsules 15, shown in FIG. 3, are shown partially withdrawn for the sake of clarity and it should be understood that when the unit 13 is finally assembled that these capsules and others, not shown, are snugly held in place within the body 14 by the covers 17, 18. The provision of the knurled surface 16 of the body member 14 contributes to the random orientation of the sample holder 13 at the irradiating position thereof by the air flow thereabout in a manner to be described hereinbelow in connection with the overall system of FIG. 4.

A typical operation of the present invention may be explained by reference to FIG. 4. The sample holder or rabbit 13, containing the capsules for irradiation, is inserted through an injector valve 24 into the pneumatic system just above a normally closed ball valve 25. Pressurized air from a blower 26 passes through a selector valve 27 and picks up the rabbit 13 to carry the same into the irradiation chamber 6 through conduit 8. It should be noted that the valve 27 is shown in its exit position such that when the rabbit is to be delivered to the chamber 6, the valve 27 is in its other position, shown by the dotted lines, and the make-up air enters the system through inlet valve 28. The closed end of conduit 8 within the chamber 6 serves as an air cushion to provide a shock absorber for the rabbit 13 when is arrives at the irradiation position within the chamber 6.

Depending upon the total gas flow and the flow through slots 12 (FIG. 2) in conduit 8 within chamber 6, the rabbit 13 will be positioned somewhere near the slots 12. This position can be monitored by a manometer 29 due to the differential pressure produced, and the position may be varied by effecting air flow through a by-pass valve 30 near the blower 26. Preoperational calibration, using visual means as well as irradiation standards may be used to determine the correct differential pressure for the desired irradiating position. Air flowing through slots 12 into conduit 7 passes out through valve 31 to a contaminated off-gas system, not shown. While supported in the air stream, the sample containing capsule or rabbit 13 is caused to spin about a precessing axis at its irradiation position due to its substantially spherical shape, and due to the knurled portion 16 of the member 14 thereof. Even though the rotation or spinning is not performed perfectly, the movement of the floating rabbit is of such a random nature as to effect a uniform irradiation of the samples within the rabbit 13.

When the rabbit or sample holder 13 is to be removed from the irradiating position, the selector valve 27 is rotated to the position shown by the solid lines in FIG. 4. The blower 26 then exits air through valve 32 to the contaminated off-gas system and brings in air through the inlet valve 33, conduit 7, slits 12 in conduit 8 and through conduit 8, such that the rabbit is returned through conduit 8 to the ball valve 25, which is now opened, and thence into a shielded enclosure 34 for subsequent transport to a counting laboratory.

From the above described operation, it can be seen that a sample holder may be readily transported from a remote location to an irradiation position and subsequently returned to the remote location, and that the sample holder is randomly rotated during irradiation to negate the effect of variations in the irradiating flux such as to provide a homogeneous irradiation of all of the sample capsules within the sample holder.

In order to demonstrate that essentially uniform flux will be received by multiple samples in the operation of the above described system, four samples of Teflon were irradiated in a 14 m.e.v. neutron flux for 2 minutes. The resultant analysis $^{18}F$ revealed a standard deviation of $\pm 0.83\%$ which does not exceed the standard deviation in counting techniques.

It should be obvious to those versed in the art that the present invention will be useful for uniformly irradiating samples with any penetrating radiations. The materials of construction are chosen to be compatible with the intended radiation type and the environment. For example, aluminum may be used when irradiations are to be conducted in the above-mentioned high energy electron linear accelerator system.

This invention has been described by way of illustration rather than of limitation and it should be apparent that it is equally applicable in fields other than those described.

What is claimed is:

1. In a system for transporting by means of a fluid medium a plurality of samples from a remote loading position to an irradiation position and after an irradiation time cycle transporting said samples back to said remote position, the improvement comprising a sample holder containing said samples, said holder being freely supported by said transporting fluid at the irradiation position during said irradiation time cycle, and said sample holder being randomly oriented at said irradiation position by said transporting fluid during the entire cycle of irradiation of the samples in said holder, thereby minimizing the effect of variations in the irradiating flux, and effecting a homogeneous irradiation of all of said samples during said time cycle; said sample holder comprising a cylindrical center member provided with a plurality of slots for receiving said plurality of samples and with a knurled exterior surface, a pair of hemispherical cover members, a threaded bolt for threadedly securing said cover members on respective sides of said center member, and a lock nut threaded on said bolt and positioned in an internal recessed portion of one of said cover members to fixedly hold said bolt in place, said cylindrical center member providing a recessed indentation in the spherical surface of said sample holder to aid in effecting said random orientation of said holder during said irradiation time cycle; said transporting system including an elongated sealed chamber at said irradiation position, said transporting system further including a first transporting tube for said sample holder, said first tube extending within said sealed chamber from one end thereof with the portion of the first tube within said chamber being provided with a plurality of elongated slits for the passage of said transporting medium therethrough, the end of said first tube within said chamber being sealed with a cover plate to provide a fluid cushion shock absorber for said sample holder when it arrives at said irradiation position, and a second tube mounted within the other end of said sealed chamber and communicating therewith to provide an exit for said transporting medium during said transporting of said sample holder to said irradiation position from said remote position and during said irradiation time cycle, said second tube providing an entrance for said transporting fluid medium when the sample holder is to be returned to said remote position at the end of said irradiation time cycle, said transporting system further including a fluid medium blower at said remote position, said blower being coupled to said first transporting tube by way of a selector valve for selectively effecting the transporting of said sample holder within said first tube to said irradiation position from said remote position and the transporting of said sample holder back to said remote position.

2. The system set forth in claim 1, further including a manometer connected to said first and second tubes leading into said sealed chamber for providing an indication of the differential pressure existing between said tubes and thus the position of said sample holder at said irradiation position, and a variable position by-pass valve connected across said selector valve, whereby the position of said sample holder at said irradiation position may be varied by variable positions of said by-pass valve.

References Cited

UNITED STATES PATENTS

| | | | |
|---|---|---|---|
| 3,284,306 | 11/1966 | Balla | 176—15 |
| 3,290,220 | 12/1966 | Mitault et al. | 176—15 |

CARL D. QUARFORTH, Primary Examiner

H. E. BEHREND, Assistant Examiner

U.S. Cl. X.R.

176—11; 250—52, 106